United States Patent
Jaasma

(10) Patent No.: US 6,412,450 B1
(45) Date of Patent: Jul. 2, 2002

(54) INJECTION DEVICE

(75) Inventor: Servatius Alfons Maria Jaasma, Eindhoven (NL)

(73) Assignee: Vialle Beheer B.V., Eindhoven (NL)

( * ) Notice: Subject to any disclaimer, the term of this patent is extended or adjusted under 35 U.S.C. 154(b) by 0 days.

(21) Appl. No.: 09/254,399

(22) PCT Filed: Sep. 5, 1997

(86) PCT No.: PCT/NL97/00507
§ 371 (c)(1),
(2), (4) Date: Sep. 28, 1999

(87) PCT Pub. No.: WO98/10184
PCT Pub. Date: Mar. 12, 1998

(30) Foreign Application Priority Data

Sep. 6, 1996 (NL) .............................................. 1003980

(51) Int. Cl.[7] .................................................. F01P 1/06
(52) U.S. Cl. ................. 123/41.31; 123/470; 239/395.7; 239/132
(58) Field of Search ............................ 123/41.31, 470, 123/541, 472, 527; 239/DIG. 19, 397.5, 132, 132.3

(56) References Cited

U.S. PATENT DOCUMENTS

| 2,264,914 A | * | 12/1941 | L'Orange | 123/41.31 |
| 3,334,617 A | * | 8/1967 | Palkowsky | 123/41.31 |
| 3,731,880 A | * | 5/1973 | Williams | 239/585.1 |
| 3,868,936 A | * | 3/1975 | Rivere | 123/472 |
| 4,325,341 A | * | 4/1982 | Yamauchi | 123/472 |
| 4,355,763 A | * | 10/1982 | Brandt | 239/302 |
| 4,434,765 A | * | 3/1984 | Eshelman | 123/472 |
| 4,502,196 A | * | 3/1985 | Kupper | 239/132 |
| 4,625,682 A | * | 12/1986 | Dietrich | 123/41.31 |
| 5,120,582 A | * | 6/1992 | Browning | 427/446 |
| 5,234,164 A | * | 8/1993 | Huhne | 239/79 |
| 5,325,838 A | * | 7/1994 | Bennett | 123/41.31 |
| 6,036,106 A | * | 3/2000 | Peet | 239/132 |

FOREIGN PATENT DOCUMENTS

| AU | 204195 | * | 3/1955 | ................. 123/470 |
| CH | 353 211 | | 5/1961 | |
| EP | 0 725 208 | | 8/1996 | |
| GB | 739028 | * | 10/1955 | ............. 239/397.5 |
| JP | 0125302 | * | 9/1979 | ............. 239/397.5 |
| JP | 4051 49214 | * | 6/1993 | ............. 239/397.5 |
| WO | WO 89/04920 | | 6/1989 | |

* cited by examiner

Primary Examiner—Carl S. Miller
(74) Attorney, Agent, or Firm—Young & Thompson

(57) ABSTRACT

An injection device for injecting liquid fuel, such as LPG, which evaporates when emerging from the injector. The device ensures that ice deposits do not form at the opening of the outlet pipe by providing an interior output pipe made of a thermally insulating material surrounded by an exterior sleeve of heat conducting material. The opening of the pipe is fitted substantially flush with the sleeve.

7 Claims, 1 Drawing Sheet

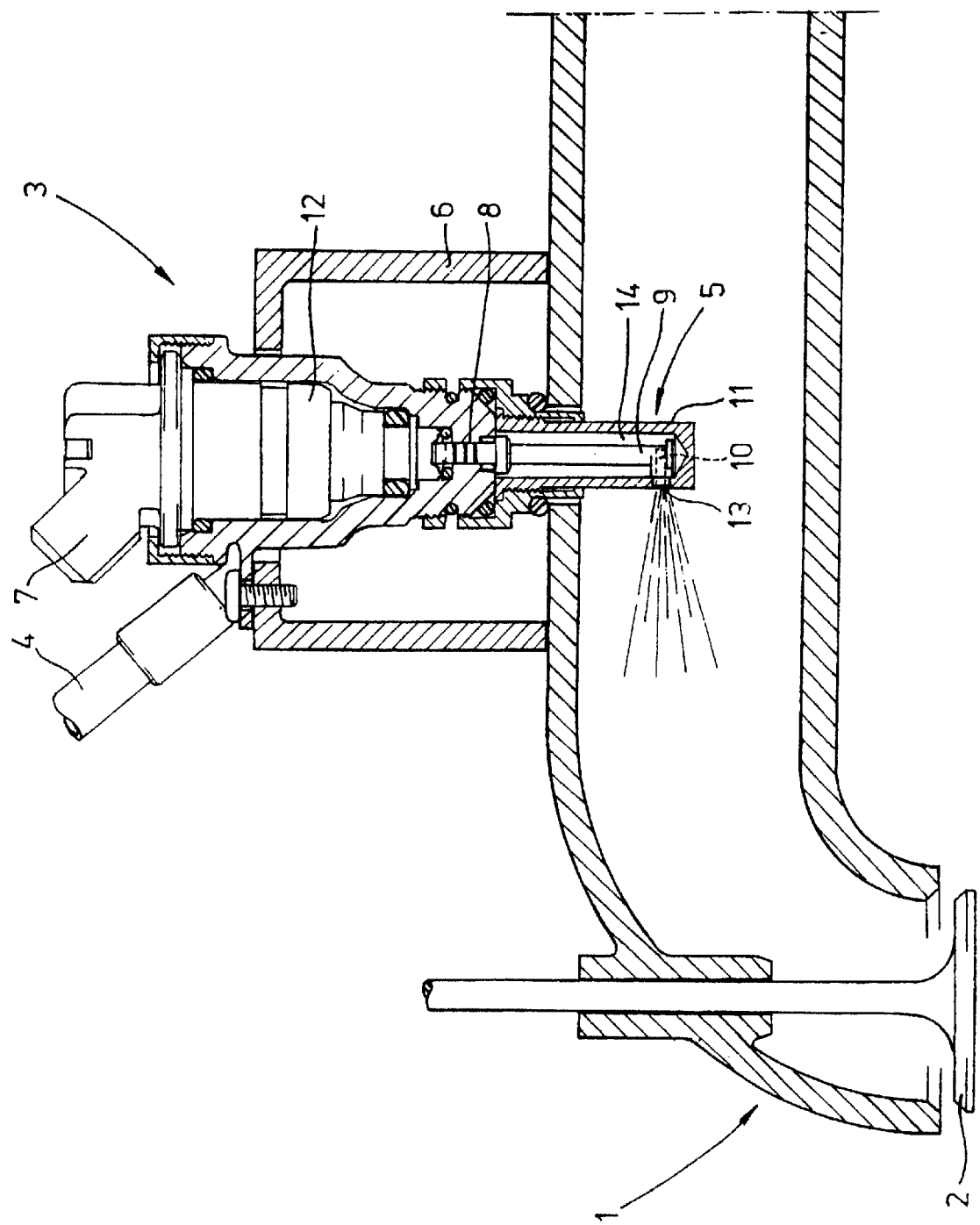

INJECTION DEVICE

BACKGROUND OF THE INVENTION

The present invention relates to an injection device for a liquid fuel.

Such an injection device is generally known in the prior art. injection of a liquid fuel has the advantage that a relatively small quantity of fuel has to be introduced per injection, so that a relatively compact injector will suffice. Moreover, when an alternative fuel such as LPG is being injected, in which case the installation concerned is fitted later, as is often the case with motor vehicles, liquid introduction is advantageous because use can be made of the control system for the original fuel injection present in such a vehicle, generally petrol injection.

However, a problem is that during the injection of such a liquid fuel into the inlet duct of the internal combustion engine a large quantity of heat is extracted during the evaporation.

In the first instance, this led to blockages of the outlet pipe of the injector because of freezing of moisture present in the air. After this problem had been overcome, inter alia through the use of a curved outlet pipe extending over a considerable distance in the outlet manifold, although no blockage of the outlet opening occurred, the problem was that moisture still froze on said outlet pipe. If a particular vehicle is under less load, the frozen ice deposit will come away from the pipe and be entrained in the stream of inlet air. This can cause considerable damage in particular to the inlet valve or valve seat, while in any case a disturbance in the operation of the engine concerned will be experienced in the form of a shock while the ice is coming away.

The object of the present invention is to avoid this disadvantage and to provide an injector with an outlet in which, on the one hand, the opening does not freeze up during the outflow of the liquid, rapidly evaporating fuel and, on the other hand, no ice deposits occur on the outlet.

SUMMARY OF THE INVENTION

The invention is based on the idea of, on the one hand, making the external part of the outlet pipe of a heat-conducting material, so that the temperature thereof during injection of the liquid fuel into the outlet pipe does not fall to such an extent that moisture can form an ice deposit. On the other hand, the interior of the pipe is made of an insulating material, so that the risk of premature evaporation of the liquid fuel does not occur and possibly lead to blockage of the outlet opening.

It is pointed out that the PCT application WO 89/04920 discloses an injection valve wherein a sliding pin made of metallic material is received in a ceramic tube. At the bottom end the pin seals off at the end of the ceramic tube. The pin is extended beyond the seal, as is the ceramic material part. This means that it will be necessary during operation to add heat to the pin, otherwise the freezing phenomenon described above will inevitably occur.

The construction according to the invention is perfected if the outlet opening of the heat-insulating pipe is fitted substantially flush with the heat-conducting material. This limits to a minimum the surface where problems might occur.

Optimum insulation between the insulating pipe and the heat-conducting material can be obtained if an empty space is provided between them. For this purpose, the heat-conducting material preferably contains a sleeve.

The outlet pipe is preferably provided with a curvature, in order to ensure that the injection of the fuel occurs extending substantially parallel to the longitudinal axis of the inlet manifold.

Plastic material is found to be extremely satisfactory as the insulating material, while a metallic material, more particularly brass, is preferably used as the heat-conducting material.

BRIEF DESCRIPTION OF THE DRAWINGS

The invention will be explained in greater detail below with reference to an exemplary embodiment illustrated in the drawing.

The sole FIGURE in this case shows diagrammatically an inlet duct of an internal combustion engine provided with an injector according to the invention.

DESCRIPTION OF THE PREFERRED EMBODIMENTS

The inlet duct is indicated in its entirety by 1, while the inlet valve present at the end is indicated by 2. The injector according to the invention is indicated by 3, and only the parts of it which are of importance to the present invention are shown. The inlet duct for fuel is indicated by 4, while the return pipe, if there is one, is not shown. The outlet for fuel is indicated in its entirety by 5. Injector 3 is fitted on the inlet manifold by means of a fixing part 6. The electrical connection is indicated by 7. The electrically operated valve, not shown in detail, is indicated by 12. Important for the invention is the fuel outlet indicated by 5. It consists of a plastic pipe 9 which is designed with a square part 10, and through the interior of which the liquid fuel such as LPG flows. Fitted at a distance therefrom is a brass sleeve 11. The end of plastic pipe 9 or square part 10 thereof, i.e. opening 13, lies substantially flush with the boundary of the sleeve 11. An empty space 14 is provided between sleeve 11 and the pipe. During operation, on injection of a liquid fuel which evaporates extremely quickly during the emergence from opening 13 the heat necessary for that purpose will be extracted mainly from the air. For the insulating nature of the plastic material of pipe 9 will mean that no heat can be extracted from other parts of the injector or the inlet manifold. This ensures that the fuel is in the liquid phase until the moment of emergence from opening 13. On the other hand, heat which is possibly extracted at opening 13 from the metal sleeve 11 through its good conductance will not lead to such a reduction in temperature of said sleeve that freezing of moisture from the inflowing air occurs.

The construction described here is extremely simple to produce. Starting from sleeve 11, pipe 9 can be fitted by snapping into place, after which this assembly is placed in the outlet opening 8 of the injector.

Although the invention was described above with reference to a preferred embodiment, those skilled in the art will understand that many variants are possible within the basic idea of the proposal for which rights are claimed.

What is claimed is:

1. Injection device for a liquid fuel which evaporates while emerging from the device, comprising an inlet for said fuel, a controllable valve for the liquid, and an outlet provided downstream of said valve, for said liquid, said outlet comprising a pipe of a heat-insulating material that is surrounded by a heat-conducting material, wherein an injection opening of the pipe is fitted substantially flush with the heat-conducting material and is free of obstruction and in which an empty space is present between the pipe and the heat conducting material.

2. Device according to claim 1, in which the heat-conducting material comprises a sleeve.

3. Device according to claim 1, in which the pipe is provided with a curvature.

4. Device according to claim 1, in which the heat-conducting material comprises a metal.

5. Device according to claim 4, in which said metal comprises a copper-zinc alloy.

6. Injection system for an internal combustion engine, comprising at least a device according to claim 1, in which said outlet is fitted in the inlet manifold of an internal combustion engine.

7. Device according to claim 1, in which the empty space extends substantially an entire length of the pipe.

* * * * *